United States Patent [19]
Sulzer

[11] 3,974,962
[45] Aug. 17, 1976

[54] POSITION LIMITING SWITCH ASSEMBLY

[75] Inventor: Harry E. Sulzer, Warminster, Pa.

[73] Assignee: Quaker City Gear Works, Inc., Huntingdon Valley, Pa.

[22] Filed: Oct. 25, 1974

[21] Appl. No.: 517,961

[52] U.S. Cl. .......... 235/132 R
[51] Int. Cl.[2] .......... G06F 15/18
[58] Field of Search .......... 235/132 R, 100, 103 R, 235/117 R, 117 B

[56] References Cited

UNITED STATES PATENTS

| | | | |
|---|---|---|---|
| 2,099,465 | 11/1937 | Bradley | 235/132 R |
| 2,581,859 | 1/1952 | Hoye | 235/132 R |
| 3,118,599 | 1/1964 | Mann et al. | 235/132 R |
| 3,243,884 | 4/1966 | Handa | 235/132 R |
| 3,244,368 | 6/1966 | Juhas | 235/132 R |
| 3,334,811 | 8/1967 | Sigl | 235/132 R |
| 3,343,789 | 9/1967 | Wales, Jr. et al. | 235/132 R |

*Primary Examiner*—L. T. Hix
*Assistant Examiner*—Vit W. Miska
*Attorney, Agent, or Firm*—John W. Logan, Jr.

[57] ABSTRACT

A position limiting switch assembly is disclosed in this application for limiting movement of an associated device within limits defining a range of allowable movement and includes an input drive assembly responsive to movement of the associated device for driving a pair of counter assemblies each of which is in driving engagement with an actuator assembly. Each actuator assembly is positioned adjacent a switch assembly and when either of the counter assemblies reaches a position corresponding to a limit position of the associated device, the actuator assembly is driven to a position wherein its associated switch assembly connects a control circuit for the associated device. The corresponding positions of said counter assemblies are adjustable to accommodate various limit positions of the associated device.

19 Claims, 14 Drawing Figures

POSITION LIMITING SWITCH ASSEMBLY

This invention relates to position limiting switch assemblies for limiting movement of an associated device within an allowable range and, more particularly to position limiting switch assemblies which are easily adjustable to accomodate a wide range of allowable movement.

Various mechanical devices are provided with an output member movable from one limit position to another whereby the limit positions define a range of allowable movement and may require that when the output member has moved to one of its limit positions, a signal be provided to stop the movement thereof. For example, certain valve assemblies including a valve member movable between open and closed positions may include a motor driving the valve member through a gear actuator. When the valve is driven to either its open or closed position, the motor should be shut off to avoid damage to the motor, gear actuator and/or valve member. In devices of this type, position limiting switch assemblies responsive to the movement of the valve member are used to activate a control circuit and shut off the motor.

Because of the wide range of movement between the open and closed positions of different types of valves, for example, the relatively small movement of butterfly valves and relatively large movement of gate valves, it is desirable that the position limiting switch assemblies be adjustable to accomodate a wide range of allowable movement. By providing an adjustability feature the position limiting switch assemblies are interchangeable among the different types of valves and, in fact, are usable with various other types of devices. Further, the adjustability feature is also desirable to accomodate for minor variations in the range of allowable movement caused by tolerance variations in the manufacture of similar type devices.

While certain adjustable position limiting switch assemblies are known, they may require disassembly and/or certain tools in order to make the desired adjustments. obviously, disassembly of the switch assembly is a time consuming technique and may be impractical in the environment in which the devices are used where the proper tools may not be available.

Accordingly, it is an object of this invention to provide a position limiting switch assembly which is adjustable without requiring any disassembly thereof in order to make the adjustment.

It is another object of this invention to provide a position limiting switch assembly which is readily adjustable and which does not require the use of any tools to make the adjustment.

Finally, it is an object of this invention to provide a position limiting switch assembly which is simple, economical, rugged and easy to use.

These and other objects of this invention are accomplished by providing a position limiting switch assembly comprising adjustable counter means and input drive means operatively engaged therewith for driving the counter means in response to movement of an associated device. Also provided is actuator means operatively associated with the counter means for controlling the position of an associated switch means connected in a control circuit for the associated device. The driving connection between the counter means and the input drive means is such that the input drive means can be disengaged from the counter means whereby adjustment of the counter means can be made. If desired, the driving connection between the counter means and the actuator means is such that the counter means can be disengaged from the actuator means whereby adjustment of the counter means can be facilitated and made more quickly.

More particularly, the counter means includes an input gear engaged by a spring biased driver gear in the input drive means, the driver gear being mounted on a shaft extending to an easily accessible position so that light axial force applied to the shaft will disengage the driver gear from the input gear. Further, the counter means includes an output rotor carried on a spring biased shaft for driving an actuator assembly drive gear and this shaft can also extend to an easily accessible position so that light axial force applied to the shaft will disengage the output rotor from the actuator assembly drive gear.

For a better understanding of the invention, reference is made to the following description of a preferred embodiment, taken in conjunction with the figures of the accompanying drawing, in which.

Figure 6:
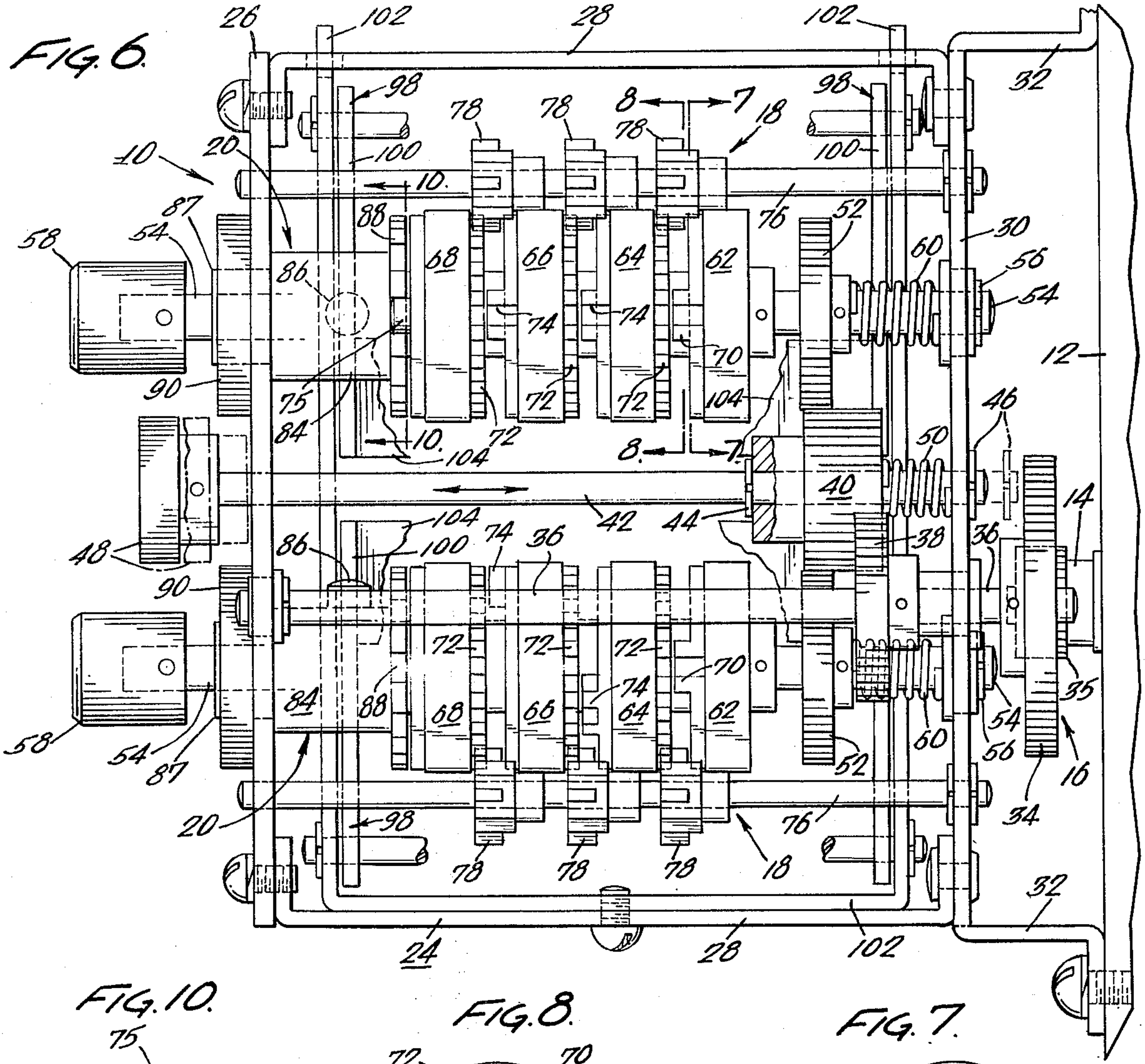
FIG. 6 is a bottom plan view of the position limiting switch assembly illustrated in FIG. 1 with portions thereof omitted for the sake of clarity.
Figure 8:
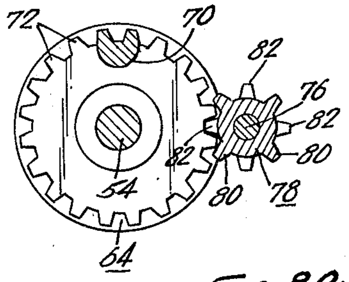
Figure 7:
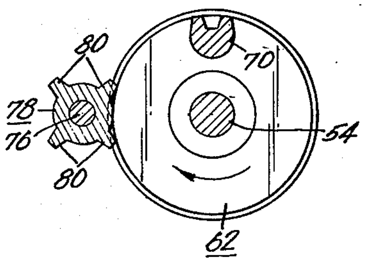
Figure 8A:
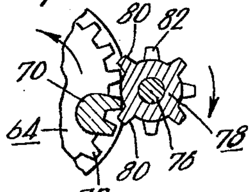
Figure 7A:
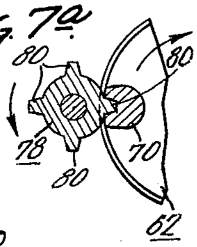
Figure 9:
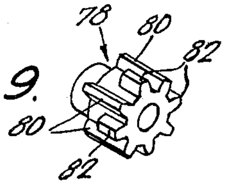

FIGS. 7 and 7*a* are sectional views taken along the line 7—7 of FIG. 6 and illustrating two different rotational positions of a rotor and rotor drive gear usable in accordance with the invention;

FIGS. 8 and 8*a* are sectional views taken along the line 8—8 of FIG. 6 and also illustrating two different rotational positions of a rotor and rotor drive gear usable in accordance with the invention;

FIG. 9 is a perspective view of the rotor drive gear illustrated in FIGS. 7, 7*a*, 8 and 8*a;*

Figure 12:
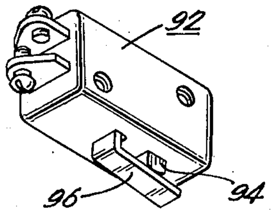
Figure 10:
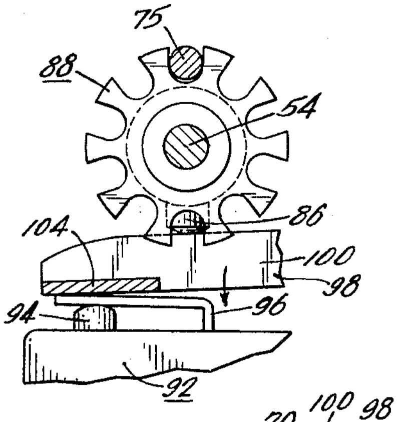
Figure 11:
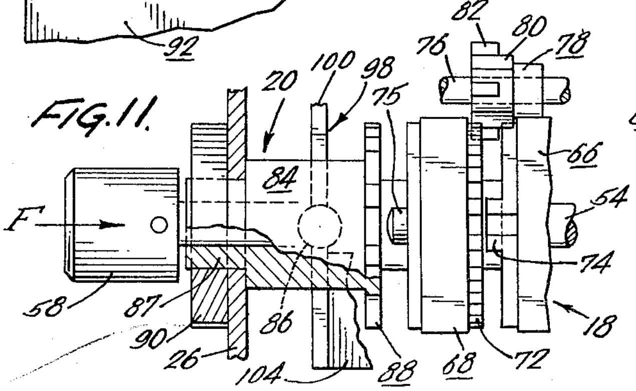

FIG. 10 is a sectional view taken along the line 10—10 of FIG. 6 and illustrates the driving connection between a counter assembly and an actuator assembly usable in accordance with the invention;

FIG. 11 is an enlarged plan view partially in section of a portion of the driving connection between the counter assembly and the actuator assembly illustrated in FIG. 6 and showing another position thereof; and FIG. 12 is a perspective view of a microswitch usable in a position limiting switch assembly in accordance with this invention.

Referring to the drawings, a preferred embodiment of the invention is illustrated and includes a position limiting switch assembly 10 and a fragmentary illustration of an associated output device 12 the operation of which is to be controlled. Output device 12 can be any of a variety of devices, having a member movable between limit positions defining a range of allowable movement. At either of the limit positions of associated device 12 position limiting switch assembly 10 activates a control circuit to develop a control signal which may be utilized to shut off a drive motor or signal an operator to discontinue movement of the associated device. Thus, device 12 includes an output gear assembly 14 movable with the associated device so that its movement can be sensed by position limiting switch assembly 10.

Position limiting switch assembly 10 includes an input drive gear system 16 in driving engagement with a pair of counter assemblies 18, 18 driving associated actuator assemblies 20, 20 which, in turn, control switch assemblies 22, 22 for activating the control circuit. As will be made clearer hereinafter, input drive gear system 16 is movable to a disengaged position relative to counter assemblies 18, 18 whereby the counter assemblies can be adjusted to correspond to different limit positions of the valve member. As will also be made clearer hereinafter, counter assemblies 18, 18 are movable to a disengaged position relative to their respective actuator assemblies 20, 20 so that the adjustment of the counter assemblies can be made in a relatively fast manner.

Before proceeding with a more complete description of the invention, it should be noted that position limiting switch assembly 10 is contained in a housing 24 comprising a first end wall 26, a pair of side walls 28, 28 and an end wall 30. As clearly seen in FIGS. 1 and 6 of the drawing, end wall 30 is formed with a pair of bracket feet 32, 32 which cooperate with suitable fasteners to secure housing 24 and position limiting switch assembly 10 to the housing of associated device 12.

Figure 1:
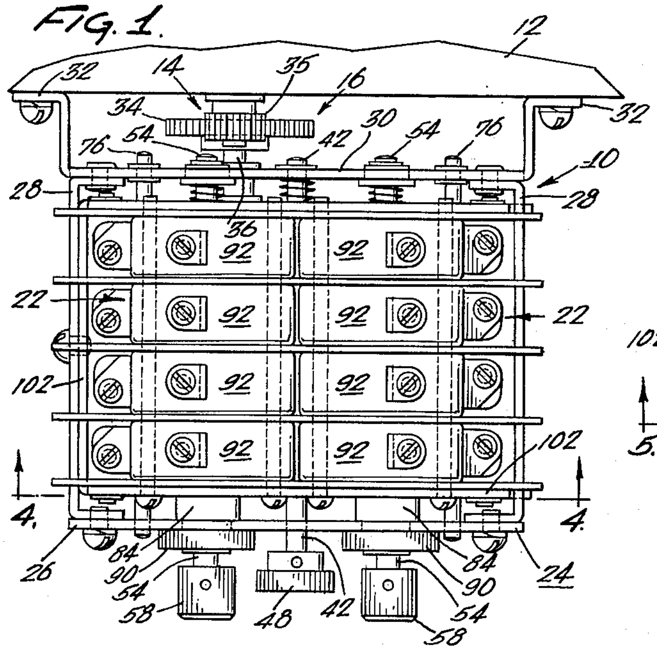
FIG. 1 is a top plan view of a position limiting switch assembly in accordance with this invention with portions thereof omitted for the sake of clarity.
Figure 4:
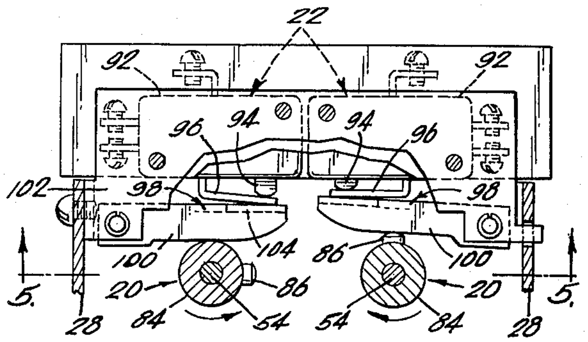
FIG. 4 is a partial sectional view taken along the line 4—4 of FIG. 1.
Figure 3:
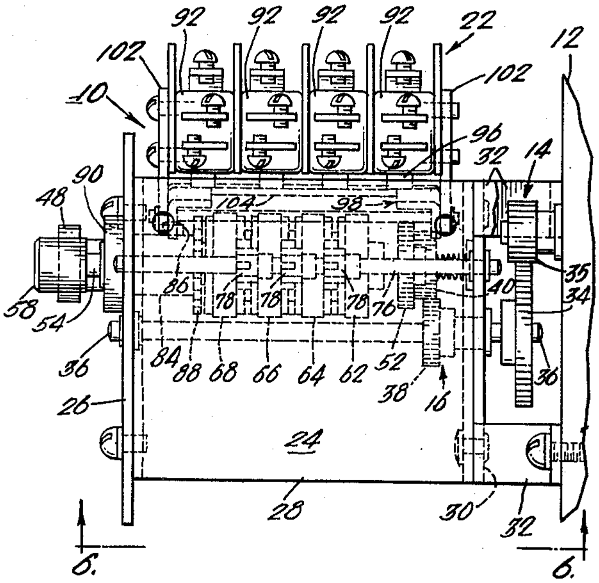
FIG. 3 is a side elevational view of the position limiting switch assembly illustrated in FIG. 1.
Figure 5:
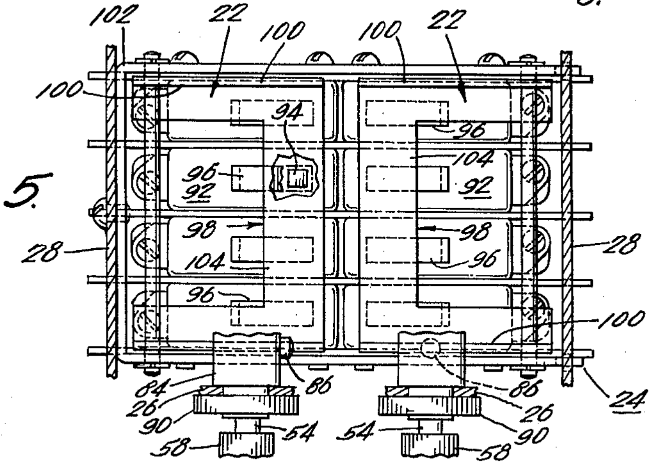
FIG. 5 is a partial sectional view taken along the line 5—5 of FIG. 4.

Referring primarily now to FIGS. 1, 3 and 6, input drive gear system 16 can be seen to include a switch assembly input gear 34 in the form of a spur gear carried on a shaft 36 rotatably mounted on end wall 26 and through end wall 30 of housing 24. Switch assembly input gear 34 is fixed to the extending portion of shaft 36 and meshes with a drive gear 35 included as part of output gear assembly 14. Adjacent the inside of end wall 30 is a spur gear 38 also fixed to rotate with shaft 34 and which is in driving engagement with a counter assembly driver gear 40 rotatably mounted on a shaft 42 carried on and extending through end walls 26 and 30 of housing 24. Relative axial movement between driver gear 40 and shaft 42 is prevented by suitable retaining rings, only one of which 44 is shown in the drawing. As also most clearly seen in FIG. 6 shaft 42 is axially movable through end walls 26 and 30 of the housing and includes a retaining ring 46 cooperating with end wall 30 for limiting movement in one direction and a knob member 48 cooperating with end wall 26 for limiting movement in the other direction. Normally, a light compression spring 50 mounted between the end face of drive gear 40 and the inside of end wall 30 biases the driver gear 40 and shaft 42 toward end wall 26. However, light axial force applied to the end of knob member 48 will move driver gear 40 and shaft 42 against spring 50 toward end wall 30.

Figure 2:
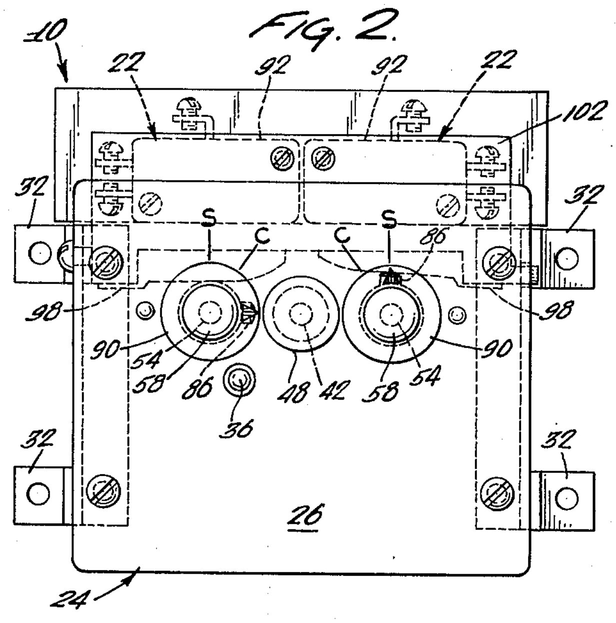
FIG. 2 is a front elevational view of the position limiting switch assembly illustrated in FIG. 1.

As best seen in FIGS. 2, 3 and 6, counter assemblies 18, 18 are the same and, accordingly, only one will be specifically described with like reference numerals being utilized for corresponding parts in the other. Each counter assembly 18 includes an input gear 52 fixed to a shaft 54 rotatably mounted through end walls 26 and 30 of housing 24. Similar to shaft 42, shaft 54 is mounted for axial movement through end walls 26 and 30 and includes a retaining ring 56 cooperating with end wall 30 for limiting movement in one direction and a knob member 58 for limiting movement in the other direction as will be made clear hereinafter. Also in the manner similar to shaft 42, a light compression spring 60 bears between the end face of input gear 52 and the inside of end wall 30 and biases the gear and shaft toward end wall 26. Light axial force applied to the end of knob member 58 will move input gear 52 and shaft 54 toward end wall 30. As thus far described, it can be seen that counter assembly driver gear 40 is biased by spring 50 into driving engagement with both counter input gears 52 and by pushing on knob member 48 is movable to a position wherein the gears are disengaged. It can also be seen that the axial length of driver gear 40 and input gears 52 are such that movement of the input gears and shaft 54 toward end wall 30 will not cause disengagement of these gears, the reason for which will be made clear hereinafter.

Also included in each counter assembly 18 is a stack of rotors including an input rotor 62, a plurality of intermediate rotors 64 and 66, and an output rotor 68. Each of the rotors 62, 64, 66 and 68 is fixed to shaft 54 in a manner precluding relative axial movement. Input rotor 62 is carried adjacent input gear 52 and is fixed to rotate with shaft 54 when the shaft is driven by the input gear and driver gear 40. A generally U-shaped axially projecting drive lug 70, the configuration of which can best be seen in FIGS. 7 and 7*a* of the drawing, is formed on the face of input rotor 62 adjacent intermediate rotor 64. As seen in the noted FIGS., the open end of drive lug 70 is adjacent the outer circumference of the rotor. Rotors 64, 66 and 68 are rotatably carried on shaft 54 and each include, on the face adjacent input rotor 62, a series of axially projecting teeth 72, formed adjacent the outer circumference of the rotor. Teeth 72 extend radially and have a shape which may best be seen in FIGS. 8 and 8*a* of the drawing. On the opposite face, each rotor 64 and 66 is formed with a generally U-shaped axially extending drive lug 74 generally similar to drive lug 70 on rotor 62 while the rotor 68 has a drive pin 75 extending from its opposite face.

Further included in each counter assembly 18 is a shaft 76 mounted parallel to and adjacent shaft 54 between end walls 26 and 30 of housing 24. Each shaft 76 carries a plurality of double spur gears 78 mounted for rotation between adjacent rotors so as to be in operative engagement therewith. As best seen in FIG. 9 each spur gear 78 includes a plurality of long teeth 80 extending throughout the axial length of the working face and a plurality of shorter teeth 82 extending throughout only a portion of the axial length of the working face. Teeth 80 and 82 are alternately located and are spaced apart such that teeth 80 are engageable with drive lugs 70 or 74 and with teeth 72 and teeth 82 are engageable only with teeth 72.

As will now be explained, each complete revolution of input rotor 62 drives the adjacent intermediate rotor 64 through an increment of rotation equal to the spacing of teeth 72. In addition, for each complete revolution of intermediate rotor 64, intermediate rotor 66 is driven through an increment of rotation equal to spacing of teeth 72 and in a similar manner, each complete revolution of intermediate rotor 66 drives output rotor 68 through an increment of rotation equal to the spacing between teeth 72. As counter assembly driver gear 40 is driven, it drives counter input gears 52 and their associated shafts 54 and input rotors 62 in opposite directions. Eventually, drive lug 70 on input rotors 62 engage one of the long teeth 80 on the adjacent double spur gear 78 as illustrated in FIG. 7*a* and drives the spur gear such that the engaged tooth 80 meshes between teeth 72 on intermediate rotor 64 causing rotation of the intermediate rotor until the driving lug disengages tooth 80. At this point a short tooth 82 engages between teeth 72 on intermediate rotor 64 restraining the intermediate rotor against rotation until a complete revolution of input rotor 62 when drive lug 70 again engages one of the long teeth 80 on spur gear 78. In a like manner, as intermediate rotor 64 is driven through a complete revolution, its drive lug 74 engages a long tooth 82 on its associated double spur gear 78 driving intermediate rotor 66 through an increment of rotation and likewise, a complete revolution of intermediate rotor 66 causes an increment of rotation of output rotor 68. While four rotors have been disclosed herein, it should be clear that any number can be utilized and that the counter assemblies 18 have a wide range of travel dependent upon the number of rotors utilized and the spacing of teeth 72.

As best seen in FIGS. 1, 4, 5, 6, 10 and 11, actuator assemblies 20, 20 are also similar and, accordingly, only one will be specifically described with like reference numerals used for corresponding parts. Each actuator assembly 20 includes a cam member 84 which, in the preferred embodiment disclosed herein, is in the form of a cylindrical sleeve member rotatably carried on shaft 54 and having a radially projecting finger 86 formed thereon. At the end of cam member 84 adjacent output rotor 68 is fixed an actuator drive gear 88 in the form of a star wheel which is engageable by drive lug 74 on output rotor 68. Thus, rotation of output rotor 68 drives cam member 84 through a corresponding displacement. At this point, it will be noted that each cam member 84 includes a reduced diameter portion 87 extending through end wall 26 and is fixed to an adjusting knob member 90 located on the outer surface of end wall 26 and cooperating with knob member 58 for limiting axial movement of shaft 54. Another function of adjusting knob 90 will be made clear hereinafter. Referring to FIGS. 6 and 11, it can be seen that spring 60 biasing shaft 54 toward wall 26 also biases output rotor 68 against actuator drive gear 88 such that drive lug 75 engages between the teeth of the actuator drive gear. As clearly illustrated in FIG. 11, light axial force applied to knob 58 is operative to move shaft 54 and, in turn, counter drive gear 52, input rotor 62, intermediate rotors 64 and 66 and output rotor 68 toward end wall 30 such that the output rotor and actuator drive gear 88 are disengaged.

Referring to FIGS. 1–5, switch assemblies 22, 22 are illustrated and can be seen to be similar. Accordingly, only one will be specifically described with like reference numerals used for corresponding parts. In the preferred embodiment disclosed herein, each switch assembly 22 includes a plurality of microswitches 92, the construction of each of which can best be seen in FIG. 12. Each microswitch 92 includes an axially extending plunger 94 and a pivoted operating arm 96, each of which is movable between a first position wherein the plunger is biased to a fully extended position as illustrated in the left-hand switch assembly in FIG. 4, to a second position wherein plunger 94 is depressed against the bias by operating arm 96 as illustrated in the left-hand switch assembly in FIG. 4. In the first position, microswitch 92 is operative in an associated control circuit to allow movement of the associated device and in the second position is operative in the control circuit to stop movement of the associated device usually by shutting off a drive motor. As noted, previously each switch assembly 22 includes a plurality of microswitches 92 and all of the microswitches could be connected in the control circuit whereby if one of the microswitches malfunctions another will activate the control circuit. Alternatively, one or more of the microswitches could be wired in the control circuit while other microswitches could be wired into other circuits controlling other functions, for example, a circuit controlling indicator lights indicating to an observer that the associated device has reached one of its limit positions.

Each switch assembly 22 includes a yoke member 98 including pivot arms 100 pivoted on a frame 102 in which microswitches 92 are carried. Yoke member 98 includes transverse arm 104 in overlying relationship with operating arms 96 on microswitch 92. One of the pivot arms 100 is located adjacent cam member 84 such that finger 86 is engageable with the pivot arm to move transverse arm 104 between first and second positions corresponding to the first and second positions of associated operating arms 96 and plungers 94.

Operation of position limiting switch assembly 10 will be explained, it being assumed, for the explanation of the operation that counter assemblies 18 hve been adjusted to correspond to the desired limit positions of the associated device in a manner to be explained hereinafter. Movement in associated device 12 which is to be controlled is transferred through its output gear assembly 14 to switch assembly input gear 34 through drive gear 35. Switch assembly input gear 34 drives shaft 36 and spur gear 38 which, in turn, drives counter assembly driver gear 40. Rotation of counter assembly driver gear 40 drives each of the counter input gears 52 and their associated shafts 54 in opposite directions, causing corresponding rotation of input rotors 62 in opposite directions. As explained previously, rotation of input rotors 62 drives output rotors 68 through intermediate rotors 64 and 66. Because of the initial adjustment of counter assemblies 18, 18 when associated device 12 reaches one of its limit positions, one of the output rotors 68 is driven through an increment of rotation causing its drive lug 75 to drive associated actuator drive gear 88 and cam member 84 so that finger 86 bears against adjacent pivot arm 100 of yoke 98. Movement of finger 86 into engagement with pivot arm 100 causes transverse arm member 104 to pivot operating arm 96 and plungers 94 to the second position. As noted previously when plungers 94 are depressed the associated control circuit is operative to stop movement of the associated device by shutting off the motor and/or provide other indicator signals. When it is desired to move associated device 12 to its other limit position, the motor is driven in the opposite direction, driving input drive gear system 16 and counter assemblies 18, 18 in directions opposite that to their previous rotation. Movement of the one output rotor 68 in the opposite direction drives its cam member 84 in the opposite direction moving finger 86 out of engagement with pivot arm 100 of yoke member 98. Thus, plungers 94 are biased to their first position. Eventually associated device 12 reaches its other limit position and the other microswitches 92 are driven to their second position. At any point intermediate the limit positions of associated device 12, both switch assemblies 22, 22 are open so that the control circuit does not shut off the drive motor.

Adjustment of counter assemblies 18, 18 will now be explained, it being understood that the adjustment is made prior to operation of the device. Associated device 12 is moved to either of its limit positions and light axial force is applied to knob member 58 of the counter assembly being adjusted as illustrated by arrow F in FIG. 11. It should be understood that until otherwise noted, reference to counter, input and actuator assemblies and to the various parts thereof will apply to the noted assemblies and parts thereof associated with the counter assembly being adjusted. Because of the axial force, shaft 54 moves toward the right as viewed in FIG. 6 and carries output rotor 68 to the position illustrated in FIG. 11 wherein its drive lug 75 is disengaged from actuator assembly drive gear 88. At this point, knob member 90 is rotated causing corresponding rotation of cam member 84 until finger 86 is spaced adjacent pivot arm 100 as illustrated by the left-hand cam member 84 in FIG. 4 of the drawing. This spacing between finger 86 and pivot arm 100 is such that one increment of rotation of output rotor 68 will drive cam member 84 so that the finger will engage the pivot arm and drive transverse arm 104 to its second position. Thus, it can be seen that this adjustment is in the nature of a coarse adjustment reducing the time for adjusting the counter assembly by eliminating the time otherwise required to incrementally rotate output rotor 68 to the appropriate position. To facilitate this adjustment, suitable indicia can be placed on the other surface of end wall 26 and on the top surface of knob 90. As illustrated in FIG. 2, end wall 26 is marked with a line C and a line S spaced apart by a distance equal to an increment of rotation of output rotor 68. Line C indicates a position wherein finger 86 is spaced from pivot arm 100 by the distance noted above and line S indicates the position wherein the finger is engaged with the pivot arm. An arrowhead marked on the top face of knob 90 cooperates with lines C and S to indicate when finger 86 is one increment of rotation from pivot arm 100 or is in engagement therewith.

Continuing the adjustment procedure, knob member 58 is released allowing spring 60 to bias drive lug 75 on output rotor 68 into engagement with actuator drive gear 88 and a light axial force is applied to knob member 48 moving counter assembly driver gear 40 and shaft 42 toward end wall 30 such that the counter assembly driver gear is disengaged from counter assembly input gears 52, 52. At this point, final adjustment of the counter assembly can be made since rotation thereof is no longer prevented by input drive gear system 16 and output gear assembly 14 of associated device 12. Knob member 58 is rotated causing corresponding rotation of rotors 62, 64 and 66 until output rotor 68 drives finger 86 on cam member 84 into engagement with pivot arm 100 of yoke member 98 moving transverse arm 104, operating arms 96 and plungers 94 to their second position. At this point knob member 90 moves with cam member 84 and the arrowhead is aligned with line S on end wall 26. Rotation of knob member 58 is discontinued and the axial force on knob member 48 is released whereby spring 50 moves counter assembly driver gear 40 into position, the associated control circuit would provide an output signal indicating that associated device is in one of its limit positions.

At this point, associated device 12 would be moved to its other limit position and output gear assembly 14 drives both counter assemblies 22, 22. When the other limit position is reached, the adjustment procedures described above are repeated for the other counter assembly. Accordingly, limit positions for the counter assemblies are established which correspond to the limit positions of the associated device 12.

It can be seen from the foregoing description, that a position limiting switch assembly has been provided which is easily adjustable without disassembly of switch assembly 10 and/or associated device 12. In addition by selecting springs 50 and 60 so as to provide only a light biasing force, fingertip pressure can be used to make the various adjustments obviating the need for special tools. Finally, it should be understood that additional counter, actuating and switch assemblies can be utilized in the position limiting switch assembly disclosed herein and could be mounted below, as illustrated in FIG. 2, counter assemblies 18, 18 so as to be responsive to output gear assembly 14.

While in the foregoing there has been disclosed a preferred embodiment of a position limiting switch assembly in accordance with this invention, it should be understood that various changes and modifications can be made within the true spirit and scope of the invention as recited in the appended claims.

I claim:

1. A position limiting switch assembly comprising counter means and input drive means operatively engaged therewith for driving said counter means in response to movement of an associated device, actuator means operatively engaged with said counter means for closing or opening associated switch means to or from adjustable limit positions, said counter means and said actuator means being relatively movable to a disengaged position whereby adjustment of said limit positions is facilitated.

2. A position limiting switch assembly in accordance with claim 1 wherein said actuator means includes an actuator drive gear and wherein said counter means includes an output driver biased into driving engagement with said actuator drive gear and being movable against said bias to a position out of engagement therewith.

3. A position limiting switch assembly in accordance with claim 1 wherein said counter means includes a plurality of counter assemblies and wherein said actuator means includes a plurality of cam members, each counter assembly being biased into driving engagement with one of said cam members and being carried on a shaft movable to a position wherein its associated counter assembly is disengaged from its respective cam member.

4. A position limiting switch assembly in accordance with claim 3 wherein each of said counter assemblies includes a stack of rotors and wherein adjacent rotors in said stack include means for driving the rotor closest to said cam members through an increment of rotation in response to rotation of the rotor closest to said input drive means through a complete revolution.

5. A position limiting switch assembly comprising counter means and input drive means operatively engaged therewith for driving said counter means in response to movement of an associated device, actuator means operatively engaged with said counter means for closing or opening associated switch means in response to movement of said counter means to or from adjustable limit positions, said counter means and said input drive means being relatively movable to a disengaged position whereby the limit positions of said counter means can be adjusted.

6. A position limiting switch assembly in accordance with claim 5 wherein said counter means and said actuator means are relatively movable to a disengaged position whereby adjustment of said limit positions of counter means is facilitated.

7. A position limiting switch assembly in accordance with claim 5 wherein said input drive means includes a driver gear and said counter means includes an input gear, said driver gear being biased into driving engagement with said input gear and being movable against said bias to a position out of engagement therewith.

8. A position limiting switch assembly in accordance with claim 5 wherein said counter means includes a plurality of counter assemblies and said input drive means includes a driver gear biased into driving engagement with said counter assemblies, said driver gear being carried on a shaft movable to a position wherein said driver gear is disengaged from said counter assemblies.

9. A position limiting switch assembly in accordance with claim 6 wherein said actuator means includes an actuator drive gear and wherein said counter means includes an output driver biased into driving engagement with said actuator drive gear and being movable against said bias to a position out of engagement therewith.

10. A position limiting switch assembly in accordance with claim 8 wherein each of said counter assemblies includes a stack of rotors, adjacent rotors in said stacks including means for driving the rotor closest to said actuator means through an increment of rotation in response to rotation of the rotor closest to said input drive means through a complete revolution.

11. A position limiting switch assembly in accordance with claim 8 wherein each of said actuator means includes a plurality of cam members and wherein each counter assembly is biased into driving engagement with one of said cam members, each of said counter assemblies being carried on a shaft movable to a position wherein its associated counter assembly is disengaged from its respective cam member.

12. A position limiting switch assembly comprising input drive means adapted to be driven by an associated device having first and second limit positions, first counter means adapted to have a first limit position corresponding to the first limit position of said associated device and second counter means adapted to have a second limit position corresponding to the second limit position of said associated device, said input drive means being operatively engaged with said first and second counter means for driving said counter means in opposite directions relative to each other whereby one of said counter means moves toward its limit position and the other of said counter means moves away from its limit position, first and second actuator means operatively engaged with said first and second counter means respectively, each of said actuator means being associated with switch means for actuating its associated switch means when its respective counter means reaches its limit position whereby a signal is provided that the associated device has reached a limit position.

13. A position limiting switch assembly in accordance with claim 12 wherein said input drive means and said first and second counter means are relatively movable to a disengaged position whereby the limit positions of said counter means can be adjusted.

14. A position limiting switch assembly in accordance with claim 12 wherein each of said counter means and said actuator means are relatively movable to a disengaged position whereby adjustment of said limit positions is facilitated.

15. A position limiting switch assembly in accordance with claim 12 wherein each of said counter means includes a stack of rotors, adjacent rotors in said stacks including means for driving the rotor closest to said actuator means through an increment of rotation in response to rotation of the rotor closest to said input drive means through a complete revolution.

16. A position limiting switch assembly in accordance with claim 12 wherein each of said actuator means includes a cam member and wherein each counter is biased into driving engagement with said cam member included in its respective actuator means, each of said counter means being carried on a shaft movable to a position wherein its counter means is disengaged from its respective cam member.

17. A position limiting switch assembly in accordance with claim 13 wherein each of said counter means and said actuator means are relatively movable to a disengaged position whereby adjustment of said limit positions is facilitated.

18. A position limiting switch assembly in accordance with claim 13 wherein said input drive means includes a driver gear and each of said counter means includes an input gear, said driver gear being biased into driving engagement with said input gears and being movable against said bias to a position out of engagement therewith.

19. A position limiting switch assembly in accordance with claim 14 wherein each of said actuator means includes an actuator driver gear and wherein each of said counter means includes an output driver biased into driving engagement with its respective actuator drive gear and being movable against said bias to a position out of engagement with its respective actuator drive gear.

* * * * *